United States Patent [19]

Huchette et al.

[11] 4,160,849

[45] Jul. 10, 1979

[54] FOODS CONTAINING POTATO PULP

[75] Inventors: Michel Huchette; Guy Bussiere, both of Lestrem, France

[73] Assignee: Roquette Freres, Lestrem, France

[21] Appl. No.: 742,001

[22] Filed: Nov. 15, 1976

[30] Foreign Application Priority Data

Nov. 17, 1975 [FR] France ............................ 75 35016

[51] Int. Cl.$^2$ .......................................... A23L 1/195
[52] U.S. Cl. ...................................... 426/94; 426/577; 426/658; 426/589; 426/660; 426/599; 426/590; 426/615; 426/617; 426/637
[58] Field of Search ............... 426/589, 658, 573, 575, 426/578, 599, 615, 616, 617, 637, 660, 465, 653, 443, 577

[56] References Cited

U.S. PATENT DOCUMENTS

| 1,019,411 | 3/1912 | Baldwin | 426/637 |
| 2,393,561 | 1/1946 | Perech | 426/589 |
| 2,520,891 | 8/1950 | Rivoche | 426/523 |
| 2,777,771 | 1/1957 | Templeton | 426/637 |
| 3,116,151 | 12/1963 | Giddey | 426/589 |
| 3,928,252 | 12/1975 | Rigler et al. | 426/589 |

*Primary Examiner*—Jeanette M. Hunter
*Attorney, Agent, or Firm*—Cushman, Darby & Cushman

[57] ABSTRACT

Potato pulp as component in the manufacture of foods such as fruit compotes, marmalades, sauces and tomato-based preparations, fruit-juices and fruit-based drinks, confectionery and fruit pastry.

25 Claims, No Drawings

FOODS CONTAINING POTATO PULP

The invention concerns new uses for potato pulp in the food sphere.

It also concerns as new industrial products the products and foods corresponding to these new uses.

It further concerns improvements relating to the manufacturing processes for the potato pulp intended for these new uses.

First of all it is pointed out that the expression "potato pulp" is intended to refer to the potato residue obtained by drying after industrial extraction of the starch.

Potato pulp generally constitutes a by-product from the extraction of starch from potatoes.

During this extraction, the cells of the potato are ruptured, e.g. in a grating machine which comprises a cylinder bearing teeth which revolves within a casing, or by means of a machine similar to a hammer mill, after which the largest part of the starch is separated from the resultant suspension, by example with the aid of a centrifugal sieve which retains the pulp and lets through the starch.

The pulp, which is then dried on a pneumatic drier comprises, as well as the unextracted starch, the internal and external cellular walls of the potato; these walls are of polysaccharides such as cellulose, hemicelluloses, pectine. The weight ratio between these polysaccharides, frequently called structural polysaccharides, and the starch essentially depends on the efficiency of the starch extraction. Modern starch factories generally enable extraction of at least 95% of the potato starch, such that a typical potato pulp constituting the residue from such an extraction contains, based on the dry matter, 20 to 45% starch, 45 to 65% polysaccharides and up to 10% of mineral, proteinic and fatty substances.

It has already been proposed to utilise potato pulp to extend products based on potatoes.

However no corresponding industrial development has been noted up until today.

An object of the invention is primarily to provide the potato pulp with new end-uses.

Towards this end, the applicants have studied in a systematic manner the properties of potato pulp and have been led to discover a certain number of facts and to make a certain number of deductions which were not noticed in the course of the said previous proposal.

Thus, it has been possible to show that the potato pulp has a remarkably high power of hydration, the coefficient of hydration without gelatinization of the remaining starch and after elimination of excess water by filtration on a Buchner, being of the order of 500 to 650% (by weight with respect to the dry pulp), the potato pulp has a very high viscosity after hydration, the term "viscosity" being however taken here in a particular sense in connection with the pulpy and therefore heterogenous nature of the product, the potato pulp neither modifies the flavor nor the pH of foods in which it is incorporated and this whatever its extent of incorporation, the potato pulp is, after hydration, exceptionally stable when subjected to the hard conditions met during processing in the food industry (high temperature for a lengthy time, important acidity), the potato pulp retaining then practically intact its ability to give, after hydration, a pulpy texture of the same nature as that presented for example by fruit compotes (or stewed fruit) or by tomato sauces directly obtained from the fruit.

Regarding the said properties of the potato pulp, the applicants offer an explanation by which they in no way intend to be bound.

The viscosity after hydration such as defined above primarily originates from the structural polysaccharides which consist of molecules of very high molecular weight.

The high power of hydration comes, like the viscosity, from the presence of the said macromolecules particularly suited to fix water; the arrangement of these macromolecules in the form of cell walls permits accumulation of water, these cellular residues adopting the role of sacs enclosing the water, which is mainly in free form (a noticeable portion of this water can be extracted by simple manual pressing).

The neutral flavor of the pulp and its indifference to the pH may perhaps be explained by the noticeable proportion of the structure polysaccharides which are chemically inert materials without actual flavor. Further, the numerous washings undergone by the pulp during its preparation eliminate the aromatic materials, i.e. the sources of the actual flavor of potatoes.

Its resistance to the action of acids and of heat is due to the chemical stability of certain of the said cell wall polysaccharides.

Its pulpy texture is also due to the presence of cell walls. After hydration, these swell up with water and give this characteristic texture which is encountered for example in tomato sauce, compotes of apple or other fruits, in pastries based on coconut, that is to say in the case of products comprising one (or more) raw material(s) extracted from vegetable reproductive organs which are constituted by cells replete with water and reserves of nutriment.

Now, the new uses of the potato pulp according to the present invention consist in utilizing said potato pulp as one component for foods of the group constituted by fruit compotes, sauces and preparations based on tomatoes, fruit-juices and drinks based on fruits, confectionery and pastries comprising fruits, as well as their equivalents. Furthermore, the foods embodying the invention are those of the group consisting of fruit compotes, sauces and preparations based on tomatoes, fruit juices and fruit drinks, confectionery and pastries comprising fruits and are characterised by the fact that one of their components is constituted by potato pulp.

The process according to the invention for preparation of potato pulp is characterised by the fact that the drying stage is carried out under conditions such that the starch fraction is gelatinised.

According to an advantageous embodiment of the said process, the drying stage is carried out in an installation of the drum-dryer type appropriate for ensuring gelatinization of the starch fraction.

The invention further envisages a certain number of further features which are possibly employed simultaneously and which will be more explicitly considered hereafter.

The preparation of foods of the group constituted by fruit compotes, sauces and preparations based on tomatoes, fruit juices and fruit-based drinks, confectionery and pastries comprising fruits, in accordance with the invention, will be carried out in the following or an equivalent manner.

In the course of manufacture of the said foods, potato pulp is employed as one component or constituency agent.

This potato pulp is in the form of a powder whose composition generally is as follows:

| starch | < 70% |
|---|---|
| humidity | 5 to 25% |
| proteins (N × 6.25) | 1 to 7% |
| inorganic or mineral material | 0.5 to 5% |
| fatty material | 0.1 to 1.5% |
| cellulosic material | 5 to 25% |
| other structural polysaccharides | 10 to 55% (amount obtained by difference) | a typical composition being the following:

| starch | 33% |
|---|---|
| humidity | 13% |
| proteins (N × 6.25) | 4% |
| inorganic or mineral material | 2% |
| oily material | 0.5% |
| cellulosic material | 14% |
| other structural polysaccharides | 33.5% (amount by difference) |

The granulometry of a pulp dried in a pneumatic drier or an equivalent unit is generally:
 of the order of 10% of particules < 200 microns
 of the order of 40% of particles between 200 and 351 microns
 of the order of 45% between 351 and 841 microns
 of the order of 5% > 841 microns.

This granulometry is convenient for a certain number of uses of the pulp. It can of course be reduced if applications are envisaged requiring a finer granulometry. Such a reduction treatment may be carried out by means of a grinding treatment.

Thus, a ground pulp has been employed whose granulometry was:
 30% of particles < 200 microns
 40% of particles between 300 and 351 microns
 30% of particles > 351 microns.

The potato pulp used in connection with the invention can be dried according to the invention under conditions such that the starch fraction is gelatinized, notably by utilization of a unit of the drum-dryer kind.

This unit can easily be provided in a starch factory instead of the customary dryer.

In the case of cold-end uses, the starch must be previously gelatinized; in this case it is more advantageous to utilized pulp dried under conditions of starch gelatinization, for example on a drum.

Pulp dried on a pneumatic dryer always requires a pre-cooking due to the fact that the ungelatinized starch is indigestible (the pre-cooking consisting for example of hydration and heating on a water-bath at 90° C. for 5 minutes).

When the pulp to be dried has been previously freed of the whole of the starch fraction — for example by enzymatic digestion and removal by washing of the sugars formed — drying on a drum-dryer can no longer be used.

This is due to the fact that when drying on a drum-dryer the pulp whose water has been mechanically extracted and which contains about 20% dry matter easily spreads on the drum and rollers), it is the starch which during the cooking provides an appropriate binding allowing the obtaining of a rigid sheet which is easily grindable; its presence is thus necessary for this mode of drying; the structural polysaccharides present facilitate on the other hand the removal of the sheet at the end of the operation.

As a consequence of the intensity of the grinding, the granulometry is more or less fine. The granulometry affects in a large extent the texture of the rehydrated pulp. A fine granulometry enhances the viscous characteristics to the detriment of the pulpy characteristics. A coarser granulometry has the opposite effect, the texture being more noticeable but irregular.

The proportions of pulp employed depend on the food in question and are selected as a function of the texture ("pulposity") and of the taste sought, while taking into account economic considerations. These proportions can be:
 0.5 to 4% and, preferably, 1.5 to 2.5% in sauces based on tomato,
 1.5 to 6.5% in products like compotes and marmalade,
 0.2 to 1.5% in fruit juices,
 1.5 to 2.5% in fruit pastes,
 1 to 6% and preferably 2 to 4.5% in confectionery ingredients
 2 to 15% and, preferably, 3 to 6% in pastries based on coconut or fruits.

The incorporation of the potato pulp during the manufacture of the said foods can be done by direct introduction of the powder or by introduction of a dispersion of the same in water.

In accordance with the use foreseen and depending on the grade of starch in the pulp, a viscosity agent can be added simultaneously thereto, which agent can be a starch derivative, a cellulose derivative, a guar or carob gum flour, an alignate or a carragheenan (thickeners without gelling action), or gum arabic.

The presence of the viscosity agent enables an increase in the "binding" or an increase in the impression of "body" or greasiness in the taste.

The viscosity agent can also be added to the pulp when drying it if the drying is carried out with gelatinization.

The examples which follow illustrate the preceding general directions. In these examples, where reference is made to "pulp" without a precise indication of its mode of drying, one is concerned with pulp dried on a pneumatic dryer whereof the starch fraction has not been gelatinized.

First of all are given four examples of the use of the invention in the manufacture of sauces based on tomatoes.

TOMATO SAUCE

In the course of a control sample, a quantity of 200 ml of tomato sauce containing 10% dry matter obtained by aqueous solution of a commercial concentrate of tomatoes containing 36% dry matter (purified and concentrated tomato pulp), is heated on a water bath at 90° C. and then maintained at this temperature for 10 minutes.

Furthermore six samples are prepared of tomato sauce containing 10% dry matter in which a part of the dry matter originates from the above mentioned tomato concentrate, the remainder being either from potato pulp (prepared with drying on a pneumatic dryer), or with a mixture of pulp and a viscosity agent, in this instance a starch known under the trade-mark "COL FLO 67".

In order to prepare these samples, one can proceed as follows:
- introduction of tomato concentrate into a beaker,
- addition of potato pulp powder and, if present, viscosity agent,
- addition of a quantity of water sufficient to obtain a dry matter of 10%,
- agitation, for example with a glass stirrer, in order to complete the mixing,
- heating on a water-bath at 90° C. for 10 minutes.

Then, the viscosity of the control and the samples after cooling at 20° C. is measured with the help of a Brookfield viscometer (20 turns per minute).

The six samples had a pH of 4.1; the concentrate has a pH of 4.

The composition of the samples and the viscosity of both the control and the samples are collected in the following Table I.

TABLE I

|  | Control | No. 1 | No. 2 | No. 3 | No. 4 | No. 5 | No. 6 |
|---|---|---|---|---|---|---|---|
| Dry tomato matter (% by weight) | 10 | 8 | 8 | 6 | 6 | 6 | 6 |
| Quantity of pulp (% by weight) |  | 2 | 1 | 4 | 3 | 2.5 | 2 |
| "COL FLO 67"* (% by weight) |  |  | 1 |  | 1 | 1.5 | 2 |
| Viscosity (in cps) at 20° C. and at 20 turns per minute | 960 | 5000 | 3500 | too high not measureable, greater than 100,000 | 11600 | 9000 | 6800 |

*viscosity agent consisting of a starch of waxy maize (waxy-maize reticulated and stabilized; not subject to retrogradation, retaining all its viscosity when cooked or sterilized in acid medium.

Visual examination shows that while the control is perfectly smooth, the pulp introduces a pulpy texture (more noticeable when the proportion of pulp increases) to the samples 1 to 6; these have a noticeably increased viscosity.

As for taste, the samples No. 1 and No. 3 have a texture judged as insufficiently "bound", giving the impression of eating either a poorly bound product lacking in oiliness or a product lacking in "body" or again a product replete with water. The viscosity agent provided in the case of samples 2, 4, 5 and 6 totally eliminates this unsatisfactory impression. Moreover, by modifying the pulp to viscosity agent ratio, one can vary at will the texture ("pulposity" and greasy feel) and thus obtain precisely the sort of sauce desired.

The properties of the samples No. 5 and 6 have been judged as particularly good.

The viscosity agent consisting of "COL FLO 67" can be replaced without disadvantage by other viscosity agents, starch derivatives or not. For example, a similar result to that with sample No. 5 has been obtained by replacing the 1.5% of "COL FLO 67" either with 0.6% of carboxymethyl cellulose (CMC) known under the trademark "BLANOSE C 190", or with 0.8% of alginate known under the trademark "LYGOMME 267/3".

Generally speaking, it has been shown that three parts of "COL FLO 67" can be replaced by 1 part of CMC.

The granulometry of the pulp has no noticeable influence on the final texture of the present sauce; this has been shown by using a finely ground pulp.

2—SEASONED TOMATO SAUCE

Sauces exist which are ready for use and which are based on tomato comprising seasoning and a viscosity agent most frequently of the starch type. Such a kind of formulation is given here below in Table II. With the sample is compared one in which the viscosity agent "COL FLO 67" is replaced with equal amount of a mixture of potato pulp and "COL FLO 67" (see table II — sample according to the invention).

TABLE II

|  | Control (g) | Sample according to the invention (g) |
|---|---|---|
| Tomato concentrate with 28% dry matter | 180 | 180 |
| Malto-dextrine (DE*:40) | 120 | 120 |
| 6° Vinegar | 100 | 100 |
| Water | 250 | 250 |
| Salt | 30 | 30 |
| Potato pulp |  | 14 |
| "COL FLO 67" | 20 | 6 |

*DE = dextrose equivalent

In the two instances, all the ingredients are mixed and then cooked on a water-bath for 10 minutes at 90° C.

In the instance of the control example, the viscosity is about 10,200 cps; in the case of the sample according to the invention, the viscosity is about 9,800 cps. The two sauces are thus very similar in viscosity level; whereas the control has a smooth texture, the product in accordance with the invention has an agreeable pulpy texture.

3—TOMATO SAUCE OF THE TYPE "DOUBLE CONCENTRATE"

Seasoned sauces are often encountered in industry based on tomatoes and comprising a viscosity agent, for example starch derivative. Such a sauce must be diluted with its weight of water before use. One possible formulation is the following:

| tomato concentrate (28% dry matter) | 200 g |
|---|---|
| salt | 15 g |
| pepper | 2 g |
| sugar | 20 g |
| onion powder | 5 g |
| "COL FLO 67" (viscosity agent) | 40 g |
| water | 718 g |

Possible mode of preparation: the various ingredients are measured and introduced into a sterilizable can; sterilization of 30 minutes at 120° C. is then required.

In addition to the control example thus formulated, another sample in which half, i.e. 20 g of "COL FLO 67" are replaced by 25 g of potato pulp (the quantity of water then becomes: 713 g).

While the said control sauce is smooth, that containing the potato pulp while having a similar viscosity further had an agreeable pulpy texture.

4—SAUCE OF THE KIND USED FOR THE MAKING OF "PIZZAS"

Such a sauce, seasoned, based on tomatoes, destined for trimming pizzas, has to be subjected to cooking for 30 minutes on a water bath at 95° C. in order to provide a sauce ready for use.

One possible formulation is the following:

| tomato concentrate (28% dry matter) | 157 g |
| water | 327 g |
| oil | 6 g |
| salt | 4.5 g |
| powdered onions | 1 g |
| pepper | 0.6 g |
| powdered garlic | 0.9 g |
| "COL FLO 67" (viscosity agent) | 3 g |

As well as this control sample, a supplementary sample was prepared in which one half, that is to say 1.5 g of the viscosity agent, was replaced by 7 g of potato pulp (the water quantity becoming: 321.5 g).

While the control sauce is smooth, that containing the potato pulp has a pulpy agreeable texture.

The four following examples relate to the use of the invention in the preparation of compotes, marmalades and products of the same general class. It is well known that these products are formulated, in accordance with French laws, of fruits and sugar having been subjected to cooking and thereafter possibly to concentration. The end product has a characteristic pulpy texture.

5—USE AS A TEXTURE IMPROVING AGENT IN A CLASSICAL COMPOTE

Frequently compotes, marmalades and products of the same general class occurring commercially have an insufficiently pulpy texture. The causes arise from numerous sources and are found for example in the severe industrial manufacturing techniques which do not sufficiently respect the fragile nature of fruits, or in the employment of fruits which have lost a part of their characteristic features following storage over a long time, for example in the presence of sulfurous anhydride, or again in the employment of fruits such as pears which are naturally unsuited for giving a pulpy texture.

To 100 g of tinned apple compote bought commercially, 12 g of potato pulp hydrated to 15% of dry matter is added, being 1.8% of dry pulp; this hydrated pulp is previously cooked on a water bath of 5 minutes at 95° C. The viscosity of the compote changes from 12,000 cps before incorporation of the pulp to 17,000 cps, and above all the texture, which for the commercial product is smooth, becomes a pulpy one after addition of the potato pulp.

With the same amount of pulp obtained on a drum, hydrated by addition of the same quantity of boiling water, the viscosity is about 18,000 cps and the texture is similar.

The same operations as with the apple compote have been effected on a pear compote; the viscosity changes from 10,000 cps to 15,000 cps with the usual pulp and 15,500 cps with the pulp obtained on the drum; the textures are analogous in the two instances. It is emphasized that in this case the improvement is marked, the commercial "pear compote" employed having practically no pulpy texture itself.

6—USE AS AN "EXTENDER" AGENT FOR COMPOTES

To 100 g of the apple compote referred to in Example 5, a mixture of potato pulp, water and sugar is added; as before, this mixture was previously subjected to cooking for 5 minutes at 95° C. on a water bath. The relative proportions of the three ingredients (pulp, water and sugar), were chosen in such a way that the viscosity and texture on the one part, the sweetening power on the other part, were close to those of a control sample of the compote to which had not been added any pulp. Two formulations of this type were prepared and are indicated in the Table III.

TABLE III

|  | Sample No. 1 (grams) | Sample No. 2 (grams) |
| --- | --- | --- |
| Apple compote | 100 | 100 |
| Potato pulp | 2 | 4 |
| Water | 23.5 | 47 |
| Sugar | 7.5 | 15 |

Comparative examination of the original compote and the compotes formulated according to the two said formulations shows that they are very similar to the control compote in viscosity (12,000 cps for the control, 12,200 cps for sample No. 1 and 12,400 cps for sample No. 2) and in texture as well as in sweetening power. The mixing amounts pulp — water — sugar added again were respectively 33% and 66% with respect to the original compote.

In sample No. 2, the replacement of the ordinary pulp with the pulp dried on the drum, hydrated by addition of water at 60° C. then incorporation of sugar, conferred a similar texture to that of sample No. 2 and a viscosity of 14,000 cps.

It is important to incorporate the sugar after complete hydration of the pulp dried on the drum, as without this hydration is not complete, the sugar retarding the penetration of the water in the pulp particles.

The formulation of sample No. 2 was repeated starting with the pear compote already used previously: the viscosity is 10,000 cps for the commercial compote, 9,400 cps with ordinary pulp and 10,200 cps with pulp dried on a drum.

7—APPLICATION AS A RECONSTITUTING AGENT FOR A COMPOTE

It can be of interest on the industrial scale to manufacture a compote not from fruit, but starting from the juice or concentrate of a fruit. In this instance, the potato pulp will play the sole role of texturizing agent; in fact it has been found to be of advantage to add thereto a viscosity agent in order to improve the "body" of the product at the moment of the taste. In the experiments described hereafter, a starch derivative is provided consisting of the said "COL FLO 67". The ingredients are introduced into a tin which is mounted and then sterilized for 15 minutes at 120° C. in a rotary sterilizer.

Two examples were prepared employing the precise quantities shown in Table IV.

TABLE IV

|  | First Example (in g) | Second Example (in g) |
| --- | --- | --- |
| Potato pulp | 5 | 5 |
| "COL FLO 67" | 2 | 2 |
| Apple Juice* | 40 | 20 |
| Sugar | 30 | 30 |
| Water | 23 | 43 |

*Apple juice composition: 11.5% dry matter of which 11.2% are carbohydrates (mainly glucose and fructose).

With the two examples, the pH is adjusted to the customary value for such a product, i.e. pH 4.2, for example with the aid of lemon juice. The compotes obtained had a dry matter content about 40%.

The viscosity agent "COL FLO 67" can be replaced by another viscosity agent which resists sterilization; thus, in the formulation of Example No. 2, replacement of 2 g of "COL FLO 67" by 0.6 g of carboxy-methyl-cellulose led to an end product with similar characteristics to those of the second example.

With the three examples, the end product was visually similar to a typical apple compote; the intensity of the apple taste being dependent on the quantity of apple juice employed. It appears that in the case where no aroma or aroma enhancer is added, the minimum amount of apple juice to obtain sufficient flavor is of the order of 30 g.

8—APPLICATION IN THE MANUFACTURE OF A COMPOTE FOR DIETIC USAGE

Replacement of part of the fruit by potato pulp allows reduction in the quantity of directly assimilable sugars introduced by the fruit pulp, and allows reduction in the dry matter content, and thus in carbohydrates.

In the Table V hereafter is shown on the one hand the composition of a compote whose sweetening agent comprises a mixture of sorbitol and levulose and, on the other hand, the composition of a compote according to the invention obtained employing the preceding.

In the preparation of these compotes the chief base matter employed is de-stoned apricots prepared "au naturel".

The levulose and sorbitol employed had 70% dry matter.

Here again, the presence of a viscosity agent was advantageous.

In a first attempt "COL FLO 67" was used.

TABLE V

|  | Control (grams) | Sample according to the invention (in grams) |
| --- | --- | --- |
| Apricot halves | 40 | 40 |
| lenulose | 30 | 30 |
| sorbitol | 30 | 30 |
| Potato pulp |  | 4 |
| "COL FLO 67" |  | 3 |
| Water |  | 50 |

The customary mode of operation is retained for the preparation of the two formulations: a rapid cooking, with stirring, of all the ingredients. The two end products are very similar one to the other from the organoleptic point of view. However, while the control has a dry matter content of 50%, the product of the invention contains only 40%.

The "CLO FLO 67" can be replaced by other products giving high viscosity; more particularly, it is appropriate to use substances which are not digestible such as carboxymethyl-cellulose: in this instance, 1 g of CMC is equivalent to 3 g of "COL FLO 67".

9—INVESTIGATION OF THE MAXIMUM EMPLOYABLE CONCENTRATION OF PULP

The determination of the maximum usable concentration of pulp both from the technical viewpoint as well as the organoleptic viewpoint, will permit to obtain, on the one hand, products of the compote type having a very low dry matter content employable as dietic products of very low calorific value, and on the other hand, products of the compote type wherein the customary sugars have been totally replaced by a sweetening composition such as: sweetening materials not directly assimilable (sorbitol, for example) and/or sweetening agents (saccharin, cyclamates, aspartine or aspartame that is to say the dipeptide L-aspartyl L-phenyl-alanine-methyl-ester). In the compote type products, the eater seeks, among other things, for a certain sweetness level. The sweetening materials traditionally used (sucrose, glucose, fructose, sorbitol, etc.) thus consist, due to their relatively poor sweetening power, an important percentage in the formulations and exert therefore an important role on the texture of the end products. In the instance where sweeteners of high sweetening power are permitted, their effect on the texture of the sweetening agents becomes insignificant due to the low amounts used. The potato pulp can thus constitute an excellent texturizing agent.

In the course of this research, the formulation has been simplified while cutting down on the sweetening materials. In the examples No. 1 and No. 2 of the following table VI, apple juice is retained. The ingredients are introduced after weighing in preserving tins, and directly subjected to a sterilization for 15 minutes at 120° C. The end products have the customary texture of a compote while the dry matter content is only respectively 10.8% and 7.0%. The addition of a sweetening agent such as aspartine in an amount of 1.66 g permits the usual sweetness level.

In sample No. 3 of Table VI, the dry matter content has been further lowered by suppression of the apple juice which contains about 11.5% dry matter of which 1.2% are carbohydrates; the taste of the fruit is then supplemented by an appropriate aroma, for example that called "natural apple aroma LC 1540". A dry matter content of only 6.1% is thus obtained without the texture being found to be diminished.

The calorific value of samples 1 to 3 is respectively, for 100 g of the product ready for eating: 28.0 - 20.2 and 11.8 kcal.

TABLE VI

|  | Sample No. 1 grams | Sample No. 2 grams | Sample No. 3 grams |
| --- | --- | --- | --- |
| Apple Juice | 200 | 200 |  |
| Potato pulp | 45 | 50 | 55 |
| "COL FLO 67" | 15 | 15 | 15 |
| Citric acid | 0.5 | 0.5 | 0.5 |
| Water | 439.5 | 734.5 | 929.5 |
| Dry matter | 10.8% | 7.0% | 6.1% |

In following a supplementary example relating to the composition of sample No. 3, 15 g of "COL FLO 67" were replaced by 5.5 g of carboxymethyl cellulose. In this instance the dry matter content dropped to 5.4% and the calorific value was lowered to 6.6 kcal per 100 g of product ready for eating.

In none of the four samples prepared was a disagreable taste noticed which would be due to the potato pulp.

In sample No. 3, 55 g of pulp can be replaced by 37 g of pulp freed from its starch and 11.9 g of CMC. The calorific value is practically equal to zero in this instance.

From these trials it can be concluded that it is possible to replace all the original dry matter with the mixture of pulp - viscosity agent.

10—APPLICATION IN THE MANUFACTURE OF FRUIT JUICE AND FRUIT-BASED DRINKS

The control drink consists of a commercially available carbonated orange drink having a fraction of 0.12% by weight dry orange pulp. This drink was chosen in view of its slight color whereby the pulp was clearly visible.

It is compared with another drink according to the invention consisting of the liquid of the control drink freed from its pulp with the help of a fine sieve, then dosed with 0.25% of potato pulp diluted to 15% in water and previously cooked at 95° C. for 5 minutes.

The two drinks are very similar, both from the taste point as well as the texture.

In another trial, 0.25% of pulp dried on a drum and directly dispersed in the drink previously freed of its actual pulp is employed; at the end of 24 hours the drink is similar to the two previous ones.

In another instance, 0.17% of pulp freed of its starch was used; the product resembled the preceding ones.

A similar result has been obtained by starting with a still orange drink.

The following examples illustrate the application of potato pulp in the manufacture of confectionery products.

11—USE IN THE MANUFACTURE OF FRUIT PASTES

The ingredients of fruit pastes are fruit pulp, sweetening materials and pectin, for example that known under the trade-mark "RUBAN JAUNE".

In order to prepare such a fruit paste, the following starting materials are used:

| | | | | | | |
|---|---|---|---|---|---|---|
| A | Pectin | 1.2 g | | | Apricot pulp | 36 g |
|   | Sugar | 5 g | | B | Powder-sugar | 53 g |
|   | Water | 18 g | | | Glucose syrup with DE 60 | 20 g |
| | | | C | Tartaric acid | 0.4 g | |
| | | | | Water | 0.4 g | |

Fraction A obtained by dispersion in water of the intimate mixture of "pectin, sugar" is allowed to rest 15 minutes before being incorporated in the fraction B previously brought to boiling. The boiling is carried on until a concentration of 76° Brix read on a refractometer at 20°.

The fraction C is added at this moment, then the resulting syrup is poured into "moulds" made of starch. After 24 hours at ambient temperature the products are removed.

Three trials were carried out; a control without potato pulp and two samples with potato pulp in increasing amounts simultaneously with a decrease in fruit pulp were prepared. In these trials only the fraction B was therefore modified as shown in Table VIII, the mode of operation being similar in the three instances (concentration before addition of the fraction C; 76 degrees Brix according to a refractometer at 20°), except for trial n° 3 where it was necessary to add a quantity of water sufficient to enable preparation of the fraction B.

In this way the concentration step was reduced the most. The gain in time and energy is appreciable.

TABLE VIII

| | Control grams | Sample 1 grams | Sample 2 grams |
|---|---|---|---|
| Apricot pulp | 36 | 18 | — |
| Sugar | 53 | 53 | 53 |
| Glucose syrup with DE 60 | 20 | 20 | 20 |
| Potato pulp | | 1.7 | 2.5 |

In the trials Nos. 1 and 2 the products have a pulpy texture more noticeable than the control. As for taste, samples 1 and 2 were judged superior to the control from the point of view of the texture; with regard to the taste sample No. 1 was judged closer to the control while sample No. 2 was found very neutral. The addition of an apricot aroma allowed this disadvantage to be overcome.

12—APPLICATION IN A FRUIT INGREDIENT

A viscous fruit ingredient is prepared which is adapted for the filling of sweets made of cooked sugar; conventionally it consists of a fruit pulp-sweetening material mixture, concentrated to a level such that its viscosity is high and approaches that of cooked coating sugar and this at the temperature of shaping (around 70° C.). A dry matter content of the order of 80% generally gives satisfaction. An example of such an ingredient is the control formulation of Table IX. In this table are also enumerated the composition of three samples in which the apricot pulp has been partially or totally replaced by the ground potato pulp, to which is added in one case, a viscosity agent.

TABLE IX

| | Control | Sample No. 1 | Sample No. 2 | Sample No. 3 |
|---|---|---|---|---|
| Apricot pulp | 60 g | 30 g | — | — |
| Ground potato pulp | — | 1.2 g | 2.5 g | 2.2 g |
| "COL FLO 67" | — | — | — | 0.5 g |
| Sucrose | 20 g | 20 g | 20 g | 20 g |
| Glucose syrup with DE 60 (80% dry matter) | 20 g | 20 g | 20 g | 20 g |
| Tartaric acid | 0.2 g | 0.2 g | 0.2 g | 0.2 g |
| Water | — | — | 10 g | 10 g |

The sugar is dissolved in the pulp-glucose syrup mixture. The whole is concentrated by boiling to a value of 80° Brix read at 20° C. on a refractometer.

The potato pulp dispersion requires no particular precautions.

In samples Nos. 2 and 3, the quantity of added water is chosen to be just sufficient to enable complete solution of the sucrose; in this way the concentration step is reduced to the most.

The gain in time and energy is appreciable.

The viscosities of the end products are adjacent for the three samples and the control. With the potato pulp the samples No. 1 and 2 have a texture a little more heterogenous, less bound recalling that of a strawberry-based ingredient. The incorporation of a viscosity agent (sample No. 3) permits to overcome this drawback at least partially.

A pulp with fine granulometry is considered preferable with such a use; this is due to the fact that by reason of the high dry matter content of the end product, the less hydrated pulp gives a more granular texture.

Potato pulp can also be used in pastries based on coconut pulp.

13—The characteristic of the products of the macaroons, rochers, congolais and other types is that they contain a noticeable proportion of almond or coconut paste; this latter gives to the end product its special characteristics, i.e. appearance as well as taste. It is to be noted that coconut contains about 16% cellulosic material originating from cell walls and 60% oily matter.

One economical formulation (control sample) is the following:

| | |
|---|---|
| Flour | 40 g |
| Wheat starch | 10 g |
| Coconut pulp | 100 g |
| Sugar | 300 g |
| Powdered white of egg | 15 g |
| Water | 90 g |

The manufacture comprises first of all the preparation of a meringue using the white of egg, sugar and water. Then the coconut is incorporated and finally the flour-starch mixture.

After shaping on a greased board, cooking for 20 minutes at 180° C. is performed.

Besides the control sample, another sample is prepared in which 50 g of coconut, i.e. half of the total, is replaced by 25 g of potato pulp and 50 g of vegetable oil. The paste is more solid than that of the control sample; it spreads out less in the oven. The biscuit has a better appearance than the control; its texture is improved and it is adjudged slightly superior in taste to the control, as the attenuation of the coconut taste is generally appreciated.

We claim:

1. A food selected from the group consisting of a fruit compote, a marmalade, a tomato-based sauce, a fruit juice, a fruit based drink, a confectionery comprising fruit and a pastry comprising fruit or coconut, said food containing an amount of neutral flavored dried potato pulp, wherein said dried potato pulp is in powder form and comprises less than 70 weight percent starch, 5 to 25 weight percent humidity, 1 to 7 weight percent proteins (N × 6.25), 0.5 to 5 weight percent minerals, 0.1 to 1.5 weight percent oily materials, 5 to 25 weight percent cellulosic material and 10 to 55 weight percent, by difference, of other structural polysaccharides, wherein the amount of said neutral flavored dried potato pulp is effective to render said food pulpy in texture.

2. The food of claim 1 which also contains a non-gelling viscosity agent selected from the group consisting of starch derivatives, cellulose derivatives, quar gum, carob gum, alginates, carragheen and gum arabic.

3. The food of claim 1 wherein the starch fraction of said potato pulp is gelatinized by drying the potato pulp in a drum dryer.

4. The food of claim 1 wherein the starch fraction of said potato pulp is gelatinized by drying said potato pulp in a pneumatic dryer and hydrating said dried potato pulp and heating the same at a temperature of 90° C. for 5 minutes.

5. The tomato-based sauce of claim 1 containing dried neutral flavored potato pulp, said dried potato pulp being present in an amount of 0.5 to 4 percent by weight thereof.

6. The tomato-based sauce of claim 5 wherein said dried potato pulp is present in an amount of 1.5 to 2.5 percent by weight thereof.

7. The fruit compote or marmalade of claim 1 containing dried neutral flavored potato pulp, the starch fraction of which is gelatinized, said dried potato pulp being present in an amount of 1.5 to 6.5 percent by weight thereof.

8. The fruit juice of claim 1 containing dried neutral flavored potato pulp, the starch fraction of which is gelatinized, said dried potato pulp being present in an amount of 0.2 to 1.5 percent by weight thereof.

9. The fruit paste of claim 1 containing dried neutral flavored potato pulp, the starch fraction of which is gelatinized, said dried potato pulp being present in an amount of 1.5 to 2.5 percent by weight thereof.

10. The confectionery comprising fruit of claim 1 and containing dried neutral flavored potato pulp, the starch fraction of which is gelatinized, said dried potato pulp being present in an amount of 1 to 6 percent by weight thereof.

11. The confectionery comprising fruit of claim 10 wherein said dried potato pulp is present in an amount of 2 to 4.5 percent by weight thereof.

12. The pastry comprising fruit of claim 1 containing dried neutral flavored potato pulp, said dried potato pulp being present in an amount of 2 to 15 percent by weight thereof.

13. The pastry comprising coconut of claim 1 containing dried neutral flavored potato pulp, said dried neutral potato pulp being present in an amount of 2 to 15 percent by weight thereof.

14. The pastry of claim 12, wherein said pulp is present in an amount ranging from 3 to 6 percent by weight thereof.

15. The pastry of claim 13, wherein said potato pulp is present in an amount ranging from 3 to 6 percent by weight thereof.

16. A process for manufacturing foods comprising incorporating dried, neutral flavored potato pulp into a food wherein said dried, neutral flavored potato pulp is in powder form and comprises less than 70 weight percent starch, 5 to 25 weight percent humidity, 1 to 7 weight percent proteins (N × 6.25), 0.5 to 5 weight percent minerals, 0.1 to 1.5 weight percent oily materials, 5 to 25 weight percent cellulosic material and 10 to 55 weight percent, by difference, of other structural polysaccharides; and wherein said food is selected from the group consisting of a fruit compote, a marmalade, a tomato-based sauce, a fruit juice, a fruit-based drink, a confectionery comprising fruit and a pastry comprising fruit or coconut.

17. The use of claim 16 wherein said dried, neutral flavored potato pulp is incorporated into said food by directly introducing the same into said food.

18. The use of claim 16 wherein said dried, neutral flavored potato pulp is incorporated into said food by introducing the same therein in the form of an aqueous dispersion.

19. The process of claim 16, wherein the food is a tomato-based sauce and wherein said potato pulp is incorporated in an amount of 0.5 to 4 percent by weight thereof.

20. The process of claim 16 wherein the food is a fruit compote or marmalade and wherein said potato pulp is incorporated in an amount ranging from 1.5 to 6.5.

21. The process of claim 16, wherein the food is a fruit juice and said potato pulp is incorporated in an amount ranging from 0.2 to 1.5 percent by weight thereof.

22. The process of claim 16 wherein said food is a fruit paste and wherein said potato pulp is incorporated in an amount ranging from 1.5 to 2.5 percent by weight thereof.

23. The process of claim 16, wherein the food is confectionery comprising fruit and wherein said potato pulp is incorporated in an amount ranging from 1 to 6 weight percent thereof.

24. The process of claim 16, wherein the food is a pastry comprising fruit and wherein said potato pulp is incorporated in an amount ranging from 2 to 15 percent by weight thereof.

25. The process of claim 16, wherein the food is a pastry comprising coconut and wherein the potato pulp is incorporated in an amount ranging from 2 to 15 weight percent thereof.

* * * * *